United States Patent [19]
Kuhnle

[11] 3,869,009
[45] Mar. 4, 1975

[54] SCALE
[75] Inventor: Ernst Kuhnle, Balingen, Germany
[73] Assignee: Bizerba-Werke Wilhelm Kraut KG, Balinge/Wurttemberg, Germany
[22] Filed: Jan. 11, 1974
[21] Appl. No.: 432,629

[30] Foreign Application Priority Data
Jan. 12, 1973 Germany............................ 2301360

[52] U.S. Cl. ................................................ 177/217
[51] Int. Cl................................................. G01g 1/06
[58] Field of Search .......................... 177/217–219, 177/224, 255

[56] References Cited
UNITED STATES PATENTS
1,749,747 3/1930 Hadley............................ 177/219 X
3,183,985 5/1965 Schick et al. ...................... 177/217

Primary Examiner—George H. Miller, Jr.
Attorney, Agent, or Firm—Michael S. Striker

[57] ABSTRACT

A balance lever is fulcrumed for pivotal movement and a load support above the balance lever is mounted independently of the latter for movement in an upright path between a plurality of positions in each of which the load support has an orientation in space which remains unchanged. Motion-transmitting coupling arrangements couple the load support with the balance lever to impose upon the latter angular incremental displacements which are indicative of the movement of the load support in the aforementioned path.

4 Claims, 7 Drawing Figures

SCALE

BACKGROUND OF THE INVENTION

The present invention relates generally to a scale, and more particularly to a balance scale. Still more particularly the invention relates to a balance scale which is particularly suitable as a scale for use on counters, tables and the like.

Balance scales using a fulcrumed balance lever are of relatively simple construction but have the advantage of great accuracy. The tangent of the angular displacement of the balance lever corresponds exactly to the magnitude of the weight which is placed on the load support of the scale. The indicating dial which cooperates with the balance lever can of course not be linear but must be arcuate, being subdivided in accordance with the tangent function. However, such dials can be produced with great accuracy and this type of scale produces an almost complete correspondence between the weight of an object or objects and the indicated value on the dial without requiring long and complicated adjustments of the scale. The dial itself can be subdivided into several thousands of subdivisions, that is it can be very accurate.

However, as advantageous as this type of scale is, it has an objectionable drawback in that it is very susceptible to inaccuracies if the support on which it is placed is not exactly horizontal. Even a minute displacement out of the horizontal will cause indicating errors of a magnitude that is not acceptable.

In order to be able to make the balance lever and therefore the overall scale of relatively small and light weight construction, the space between the knife edges on which the balance lever is balanced and the knife edges via which motion is transmitted from the load carrier to the balance lever, is desired to be as small as possible. In correspondence with this small space or distance, a parallelogram linkage which guides the load support for parallel movement must be correspondingly small. In addition, to obtain a better utilization of the force of the balance lever and a large measuring path, the angle of deflection of the balance lever must be as large as possible. These are requirements which are imposed by the needs of the users of such scales but which, unfortunately do not contribute to a technical perfection of the scale in terms of the measuring accuracy. On the contrary, from this latter point of view, it is desirable that the parallelogram linkage for the load support be as long as possible and that the angular displacement of the balance lever be as small as possible, features which would also serve a more ready adjustability of the scale.

The difficulties in the prior-art constructions are particularly aggravated in cases where the load support is to be subjected or can be expected to be subjected to high corner and side loads which develop if the material to be weighed is not properly placed onto the load support, that is, if it is placed so that its weight will predominantly act upon a side or a corner region of the load support. If, in addition, a high resolution of the weight indication is required, for instance 10,000 subdivisions for the dial, and therefore greater accuracy is needed, the problem becomes even more difficult.

It is clear therefore, that further improvements in this type of scale are highly desirable.

SUMMARY OF THE INVENTION

It is, accordingly, an object of the invention to provide an improved balance scale of the type under discussion.

More particularly, it is an object of the invention to provide such an improved balance scale which is little or not at all influenced if it is not exactly level in its positioning, and wherein the stability of the zero point and the angular displacement of the balance lever are increased.

In keeping with these objects and with others which will become apparent hereafter, one feature of the invention resides in a scale, particularly a stable scale, in a combination which comprises a balance lever which is fulcrumed for pivotal movement, and a load support above the balance lever for supporting a load to be weighed. Mounting means mounts the load support for movement independently of the balance lever in an upright path between a plurality of positions in each of which the orientation of the load support in space is unchanged. Motion-transmitting coupling means couples the load support with the balance lever in order to impose upon the latter angular incremental displacements which are indicative of the movements of the load support in the path.

The invention is based upon the realization that susceptibility to misindication of the type of scale here in question is substantially reduced if the load support is guided for movement in an exactly vertical path, or in a path which is at most slightly arcuate. In the prior-art scales of this type, wherein the load support is directly in engagement with and supported by a knife edge balance of the balance lever upon which it acts, this is not possible because of the small spacing between this knife edge and the knife edge on which the balance lever itself is fulcrumed. That makes it impossible in the prior art to arrange the mounting means which guides the load support for parallel movement, independently of the balance lever and yet to indirectly have the load act upon the balance lever, and this in turn, makes it impossible to obtain the advantages of the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
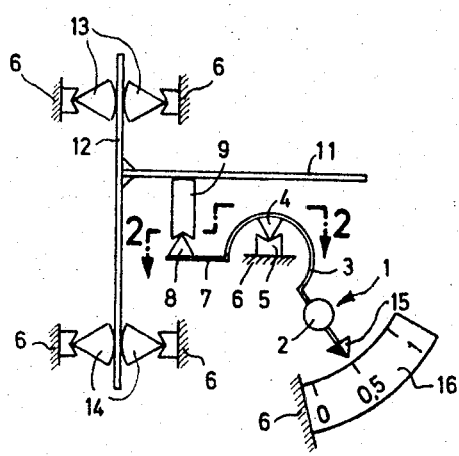
FIG. 1 is a diagrammatic side view illustrating one embodiment of the invention.
Figure 2:
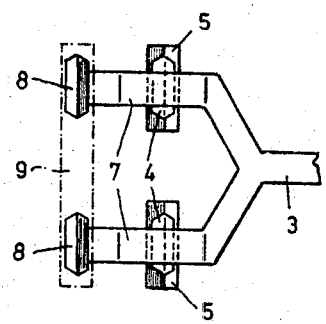
FIG. 2 is a section taken on line 2—2 of FIG. 1.

Discussing now the drawing in detail, and referring firstly to the embodiment of FIGS. 1 and 2, it will be seen that reference numeral 1 identifies a balance lever having a weight 2 and an arm 3. The lever 1 is fulcrumed, that is pivotably mounted by means of two knife edges 4 each of which engages one of two seats 5. Only one each of the knife edges and seats is shown in FIG. 1, but both are visible in FIG. 2. The seats 5 are fixedly mounted on the diagrammatically illustrated frame 6 of the scale.

FIG. 2 shows that balance lever 1 has a double arm 7 which is provided with two further knife edges 8 on which a coupling member 9 is supported which bridges the two knife edges 8 and is provided at its underside with a seat that engages these knife edges, whereas its upper end is provided with a part-cylindrical or part-spherical surface that engages the planar underside of a load support 11 onto which the object or objects to be weighed will be placed. Because of the configuration of the surface of the member 9 which engages the underside of the load support 11, the member 9 can perform a rocking movement with respect to the load support 11.

It will be appreciated that in place of a single member 9 bridging both of the knife edges 8, two members 9 could be provided each of which engages only one of the knife edges 8.

In accordance with the present invention, the load support 11 is guided for movement parallel to itself and that the guidance is independent of the balance lever 1. In the embodiment of FIGS. 1 and 2, the load support 11 is provided with a vertically extending rail 12 which is rigidly connected with it, and which is readily shiftable with minimal play in vertical direction between members 13, 14 which for instance may be mounted via knife edge bearings on the frame 2. Of course, in direction normal to the plane of the drawing of FIG. 1, the load support 11 will have a certain dimension, so as to be large enough to accommodate the material to be weighed. This means that either in front of or behind the illustrated rail 12 there will be at least one additional corresponding rail extending in parallel to the rail 12 and also guided in the same manner as has been illustrated for the rail 12. In addition, in actual practice, the load support 11 is also so guided that it cannot move in direction normal to the plane of FIG. 1. The arrangement for this purpose can also utilize a guide rail and components corresponding to the elements 13 and 14. However, what is important is that the load support 11 is guided for vertical movement in parallelism with itself, so that it can readily move to a plurality of positions depending upon the weight which is placed upon it, this movement being compensated by the balance lever 1. The force transmitted by the weight resting upon it to the load support 11 is indirectly transmitted in an always vertical direction via the member 9 to the knife edge 8, causing the balance lever 1 to be pivoted through an angle corresponding to the movement imparted upon it by the load support 11 and hence indicative of the weight resting upon the load support 11.

I have chosen in FIG. 1 to illustrate the balance lever 1 in a center position intermediate its zero position and its maximum deflected position, and to show an indicator 15 which moves over a dial 16 that is mounted on the frame. In actual fact, however, it will usually be preferred to replace the indicator 15 with an optical dial, for instance in form of a transparency or the like which moves with the balance lever 1 and which is projected at strong modification onto a ground glass screen whereon an indicator mark is provided to indicate the particular weight.

What is important in this embodiment is that special means are provided, namely the rail 12 and the associated members 13 and 14, which guide the load support 11 for vertical movement in parallelism with itself and independently of the balance lever 1. In this manner the parallel guidance arrangement can be produced and constructed in a very exact manner, and in particular is no longer dependent upon the usually small spacing between the knife edges 4 and 8. This produces a scale that is much more resistant to misindications even if it is not positioned in an exactly horizontal manner, and in addition the parallel guidance arrangement can also be so constructed that even a non-uniform distribution or arrangement of the load supported on the load support 11 will not result in a false weight indication by the scale.

Figure 3:
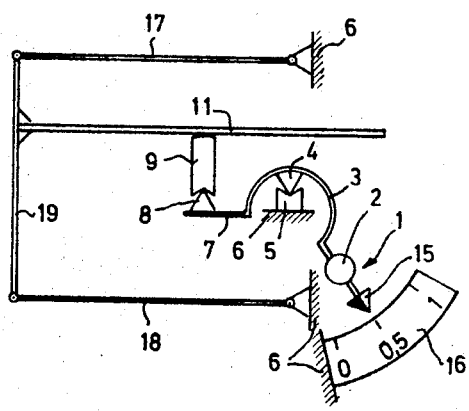
FIG. 3 is a view similar to FIG. 1 but illustrating a further embodiment of the invention.

In the embodiment in FIG. 3 in which like elements are identified with like reference numerals as in FIGS. 1 and 2, the parallel guidance arrangement uses two relatively long parallelogram linkages 17 and 18. This construction is somewhat simpler and less expensive than that of FIG. 1, and is sufficient for most applications. The linkages 17 and 18 are pivoted at one end to the frame 6 and at the other end to an arm 19 which extends rigidly from the load support 11 in upward and downward direction. Because the linkages 17 and 18 act independently of the balance lever 1 and their length is substantially greater than the spacing between the knife edges 4 and 8, or at least can be substantially greater, the embodiment of FIG. 3 is also not affected by non-level orientation of the scale.

An additional, non-illustrated linkage is required in this embodiment in order to obtain proper guidance of the load support 11, since the latter of course has a certain depth and direction normal to the plane of FIG. 3. In addition, the load support 11 must be guided so that it cannot move in direction normal to the plane of FIG. 3, which has been described with respect to FIG. 1.

Figure 4:
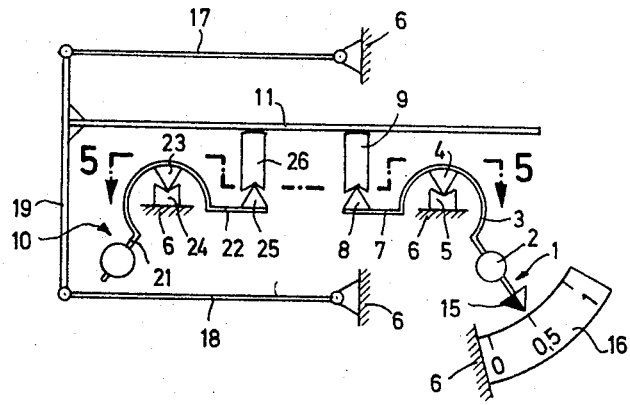
FIG. 4 is a view similar to FIG. 3 illustrating an additional embodiment of the invention.

The embodiment of FIGS. 4 and 5 again uses the same reference numerals for like components as in the preceding embodiments. In addition, however, it also uses a second or auxiliary balance lever 10 which in its operation and dimensions corresponds to the balance lever 1. The balance lever 10 has arms 21 and 22 which are in part bifurcated as shown in FIG. 4, and rests by means of two knife edges 23 on a pair of seats 24 which in turn is mounted on the frame 6. A single knife edge 25 is provided which carries a member 26 corresponding to the member 9 described with reference to the embodiment of FIG. 1; such a member 9 is provided also in conjunction with the balance lever 1 in FIGS. 4 and 5. The member 26 engages the planar underside of the load support 11 and operates in exactly the same manner as the member 9.

Figure 5:
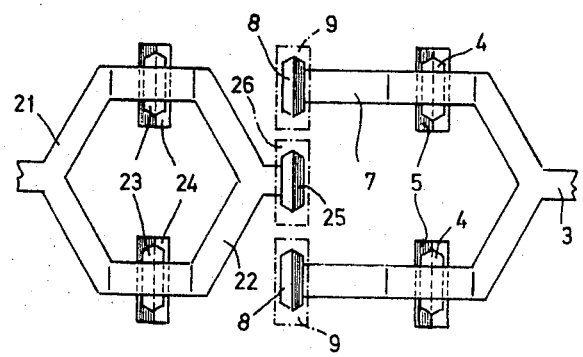
FIG. 5 is a section taken on line 5—5 of FIG. 4.

The load support 11 is guided for movement in parallelism with itself in the same manner as in FIG. 3, namely by means of two relatively long parallelogram linkages 17, 18, independently of the balance levers 1 and 10. As FIG. 5 shows clearly the knife edge 25 is located between and in alignment with the knife edges 8, the latter of which each have one of the members 9 associated with them, and the member 26 is located between these two members 9.

When a weight acts upon the load support 11, the balance lever 10 will perforce move in the opposite direction to the movement of the balance lever 1, but through the same angular distance as the latter. The use of the balance lever 10 all in itself serves to improve the resistance of the scale to misindications due to deviations from the exact horizontal orientation. However, it was found and can be calculated that the independent guidance of the load support 11 by means of the parallelogram linkages 17, 18 substantially improves this resistance.

It will be appreciated that the parallelogram linkages 17 and 18 in FIG. 4 could be replaced with the guidance arrangement 12, 13 and 14 of FIG. 1.

Figure 6:
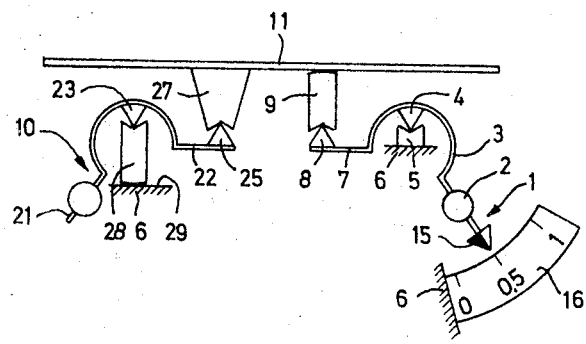
FIG. 6 is a view analogous to FIG. 4 illustrating a further embodiment.

FIG. 6 shows a further embodiment of the invention, like reference numerals again identifying like elements. FIG. 6 differs differs from the embodiment of FIGS. 4 and 5 merely in that a different connection is established between the balance lever 10 and the load support 11. Here, the parallel guidance for the load support 11 is not shown, but it should be understood that it can be the same as in FIGS. 1 or 3.

A member 27 is fixedly mounted on the underside of the load support 11 in FIG. 6, being provided with a seat which is engaged by the knife edge 25. In this case, the knife edge 23 on which the balance lever 10 is fulcrumed is supported on a seat formed in a member 28, a lower end of which has a part-cylindrical or part-spherical surface of such radius that the center coincides with the knife edge 23. This surface engages a horizontal surface 29 on the frame so that the member 28 can rock on this frame. In all other respects the embodiment of FIG. 6 corresponds to the previous embodiments as to its operation and advantages.

Figure 7:
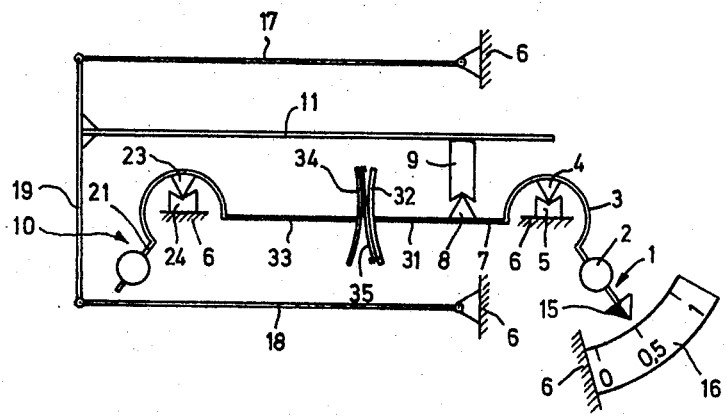
FIG. 7 is a view similar to FIG. 6 illustrating still another embodiment of the invention.

Coming, finally, to the embodiment shown in FIG. 7, it will be seen that this differs from FIGS. 4 – 6 in the manner in which the balance lever 10 cooperates with the load support 11. In this embodiment, the load support 11 is again guided for parallel movement independently of the balance levers 1 and 10 by means of parallelogram linkages 17, 18 which, however, could be replaced by the type of arrangement used in FIG. 1.

In contradistinction to the embodiment of FIG. 6, FIG. 7 does not couple the balance lever 10 directly with the load support 11, but only indirectly via a coupling with the balance lever 1. For this purpose the arm 7 of the balance lever 1 is provided with a rigid extension 31 which carries at its free end a cylindrical surface 32 having a radius of curvature the center of which coincides exactly with the line connecting the two knife edges 4. A similar rigid extension 33 is provided on the balance lever 10 being formed with a part-cylindrical surface 34 having a radius corresponding to that of the surface 32 and having its center located on the line connecting the knife edges 23.

In this, as in other embodiments using the auxiliary balance lever 10, the latter corresponds in its dimension and in its effect to the balance lever 1 exactly. The two knife edges 4 and 23 and the associated seats 5 and 24 are so spaced from one another that the cylindrical surfaces 32 and 34 are almost but not quite in contact. A thin elastically bendable strip 35, for instance of steel or synthetic plastic material, is connected with the upper edge of the surface 32, and with the lower edge of the surface 34, conforming itself to a part of the surface 32 and to a part of the surface 34. Because the pivotal motion of the balance lever 10 is counter to that of the balance lever 1, and vice versa, the member 35 is maintained in tension and assures that the balance lever 10 will respond to a movement of the balance lever 1 by moving in a direction counter to that of the balance lever 1, but through an angular increment which exactly corresponds to that of the balance lever 1.

It will be appreciated that the illustrated embodiments are merely exemplary. If, for instance, the arcuate surfaces of members 9, 26 and 28 are not part-cylindrical but instead are part-spherical, the parallelogram linkages 17, 18 could be turned through 90° so that they would extend normal to the plane of the respective Figures.

It will be understood that each of the elements described above, or two or more together, may also find a useful application in other types of constructions differing from the types described above.

While the invention has been illustrated and described as embodied in a balance scale, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In a scale, particularly a table scale, a combination comprising a balance lever fulcrumed for pivotal movement; a load support above said balance lever for supporting a load to be weighed; mounting means mounting said load support for movement independently of said balance lever in an upright path between a plurality of positions in each of which its orientation in space is unchanged; motion-transmitting coupling means coupling said load support with said balance lever to impose upon the latter angular incremental displacements which are indicative of the movements of said load support in said path; a fulcrumed additional balance lever below said load support; and additional coupling means directly coupling said additional balance lever with said load support.

2. A combination as defined in claim 1, wherein said coupling means and additional coupling means comprise rockable motion-transmitting elements.

3. In a scale, particularly a table scale, a combination comprising a balance lever fulcrumed for pivotal movement; a load support above said balance lever for supporting a load to be weighed; mounting means mounting said load support for movement independently of said balance lever in an upright path between a plurality of positions in each of which its orientation in space is unchanged; motion-transmitting coupling means coupling said load support with said balance lever to impose upon the latter angular incremental displacements which are indicative of the movements of said load support in said path; an additional balance lever below said load support; knife edge bearing means fulcruming said additional balance lever for pivotal displacement, including a rockable bearing element having a seat, and a knife-edge bearing in engagement with said seat; and additional motion-transmitting coupling means coupling said additional balance lever with said load support.

4. In a scale, particularly a table scale, a combination comprising a balance lever fulcrumed for pivotal movement; a load support above said balance lever for supporting a load to be weighed; mounting means mounting said load support for movement independently of said balance lever in an upright path between a plurality of positions in each of which its orientation in space is unchanged; motion-transmitting coupling means coupling said load support with said balance lever to impose upon the latter angular incremental displacements which are indicative of the movements of said load support in said path; an additional balance lever fulcrumed beneath said load support with said additional balance lever; a part-cylindrical surface portion of identical radius on each of said balance levers, said surface portions facing one another with slight spacing and the radius of curvature of each surface portion being centered upon the pivot axis of the respectively associated balance lever; and a flexible band member connecting said surface portions in flexible engagement therewith.

* * * * *